Sept. 4, 1934.   A. J. NICHT, JR   1,972,598
HOIST SHEAVE
Filed Feb. 18, 1931   2 Sheets-Sheet 1

Inventor
A. J. Nicht, Jr.
by
Attorney

Sept. 4, 1934.   A. J. NICHT, JR   1,972,598
HOIST SHEAVE
Filed Feb. 18, 1931   2 Sheets-Sheet 2

Inventor
A. J. Nicht, Jr.
by
Attorney

Patented Sept. 4, 1934

1,972,598

UNITED STATES PATENT OFFICE 1,972,598

HOIST SHEAVE

Alexander J. Nicht, Jr., Milwaukee, Wis., assignor to Allis-Chalmers Manufacturing Company, Milwaukee, Wis., a corporation of Delaware Application February 18, 1931, Serial No. 516,619

10 Claims. (Cl. 64—17)

This invention relates in general to the art of pulleys and relates more specifically to improvements in the construction of sheaves for hoisting systems or the like.

Hoisting systems are frequently called upon to carry heavy loads from elevation to elevation at considerable velocities. Therefore, if the hoisting system comprises a flexible element, such as a rope, attached at one end to the support for the load and having its intermediate portion trained over a sheave and having its other end secured to the periphery of a driving drum, the rope will be subjected to more or less relative sliding friction resulting in rope wear, between it and the sheave the magnitude of which depending upon among other things, the magnitude of the moment of inertia of the sheave at the angular velocity thereby obtained prior to the stopping of the driving drum, to place the load at the changed elevation. The moment of inertia is equal to the product of the square of the radius of gyration and the mass or weight of the body revolving about an axis and may be represented by $WR^2$ or $kMR^2$. In this formula R designates the distance of the center of gyration from the axis of rotation and is called the radius of gyration.

This invention contemplates a sheave suitable for systems, as outlined above, in which the radius of gyration is of a considerably reduced value such that the moment of inertia thereof, at the same angular velocity, may be but one-half that of the sheaves of like nature and of the same rope race diameter, at present known to the art. In order to attain said reduced value of the moment of inertia, this invention contemplates a sheave built up of structural steel elements secured to a hub member, with the various elements rigidly secured together by welding.

It is a specific object therefore, of this invention to provide a sheave having a relatively low $WR^2$ value whereby rope wear is materially reduced.

It is another object of this invention to provide a sheave that is simple in construction, durable and relatively light in weight.

Another object of the invention is to provide a sheave of the character described, with a sectional liner ring which may expeditiously be replaced when worn, without removing the rope normally cooperating with the peripheral groove of the sheave therefrom, and without lengthy curtailments of the hoisting operations to make the changes as required heretofore.

Another object of the invention is to provide a sheave of the character described, and having a sectional liner ring which permits of considerable increase in depth of the rope groove therein, through wear, before replacement of the liner ring becomes necessary.

Other objects of the present invention will be apparent from a consideration of the detailed description hereinafter found in the specification when taken in connection with the accompanying drawings wherein several embodiments of the invention are shown and on which the same or similar characters of reference refer to the same or similar parts in all of the several views.

Figure 1:
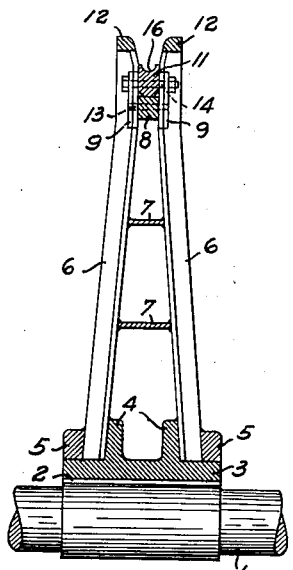
Fig. 1 is a fragmentary sectional view taken along line I—I of Fig. 2, looking in the direction of the arrows.
Figures 2, 3:
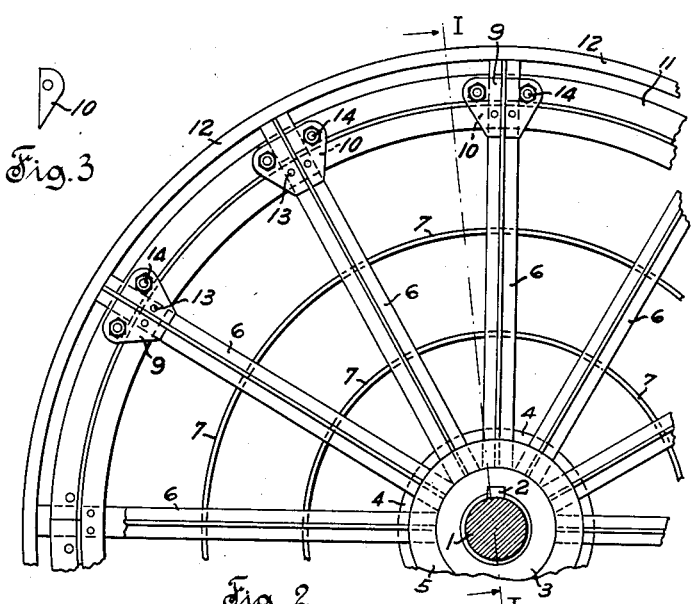
Fig. 2 is a fragmentary plan view of a sheave constructed according to this invention.
Fig. 3 is a detail of one of the elements of the sheave shown in Figs. 1 and 2.

Referring to Figs. 1 and 2, reference numeral 1 represents a shaft to which the hub 3 may fixedly be secured by a key 2. The hub 3 which carries the other sheave elements may be of cast steel and is provided with a pair of spaced annular flanges 4, intermediate its ends, to each of which are secured so as to extend in radial directions and in axially opposed relation a plurality of diametrically opposed arms 6 of structural T iron by welding the flanges thereof to the engaged surfaces of the flanges 4. The arms 6 secured to one flange 4 are similar to, but oppositely positioned from that of the arms 6 secured to the other flange 4. So that each pair of radial arms 6 secured to the flanges 4 is in coverging relation over a considerable portion of its length, in substantially parallel relation near its outer end and in diverging relation at its outer end to fasten the rope guiding rings 12 thereto. To stiffen the arms 6, rings 5 are slipped over the ends of hub 3 to engage arms 6 to which arms and the hub 3 the rings 5 may be rigidly secured by welding. To further stiffen the arrangement of arms 6 they are connected together by axially directed stiffening rings 7 welded to the opposed flange surfaces thereof.

Between the parallel portions of the arms 6 and in substantially concentric relation with the hub 3 is positioned a solid foundation ring 8 having a machined outer circumferential surface and being secured to each arm 6 by welding and also by a pair of dowels 13 each of which passes through registering holes in the securing plates 9 which abut the webs of the T arms 6 and to the flanges of which, plates 9 are secured by welding the ends of the dowels 13 to the securing plates 9. Filler ears 10, see Fig. 3, fill in the spaces bounded by plates 9, between the plates 9 and the adjacent surfaces of the foundation ring 8. The plates 9 are thus rigidly secured to the arms 6 and they provide effective means for forming a secure attachment between a sectional steel liner ring 11 comprising segments, also positioned between the parallel portions of the T arms 6, and the arms 6 through bolts 14 passing through registrable holes in the liner ring sections, in the securing plates and in the filler plates, 11, 9 and 10, respectively. The liner ring 11 bears against the outer machined circumferential surface of the foundation ring 8 and the other circumferential face of the liner ring 11 may be provided with an initial rope groove 16 which cooperates with the outer end diverging portions of each pair of arms 6 and the rope guiding rings 12 secured to the outer ends of the arms 6 by welding, to form a complete groove or race in the sheave. The segmental sections forming the liner ring 11 are preferably of uniform size with each segment having an arc subtended by one of the uniform angles between adjacent T arms 6.

Figure 4:
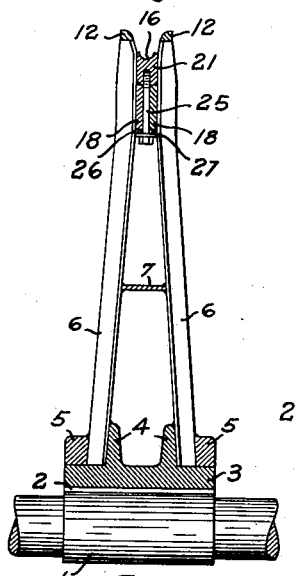
Fig. 4 is a fragmentary sectional view taken along line IV—IV of Fig. 5, looking in the direction of the arrows.
Figure 5:
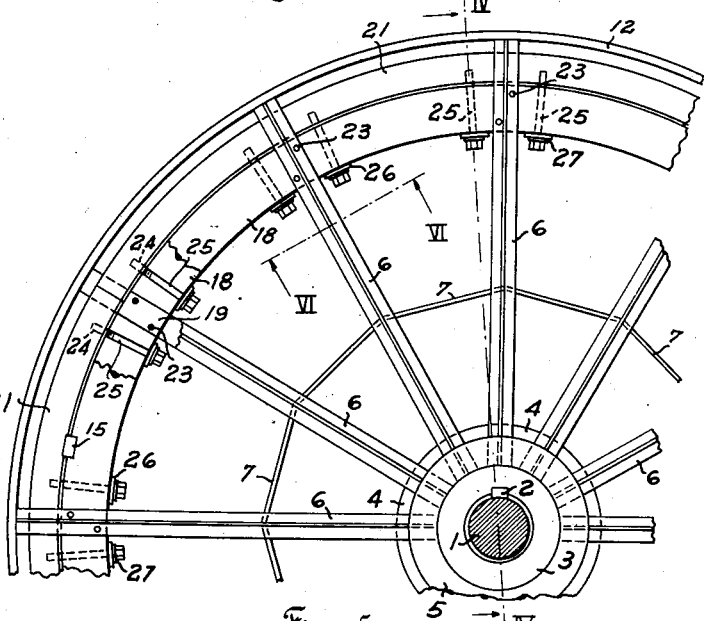
Fig. 5 is a fragmentary plan view of a modified form of sheave constructed according to this invention.
Figure 6:
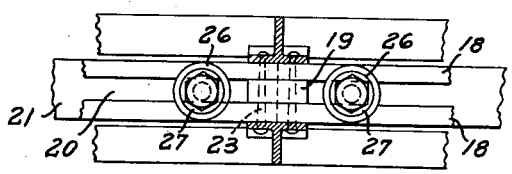
Fig. 6 is an enlarged fragmentary, sectional view taken along line VI—VI of Fig. 5, looking in the direction of the arrows.

The modified form of sheave shown in Figs. 4, 5 and 6 differs essentially only from the sheave just described in the foundation ring, in the manner of securing it to the arms 6 and in the manner of securing the sectional liner ring to the arms 6 and the foundation ring. These differences will become manifest as the description of this form of sheave proceeds. The arms 6 are secured to annular flanges 4 of a cast steel hub 3 by welding and are stiffened by rings 5 secured to the hub 3 and to the inner ends of arms 6 exactly as are the arms 6 of the sheave shown in Figs. 1 and 2. The pairs of arms 6 are, furthermore formed and positioned to provide, a converging portion between each pair, a substantially parallel portion near the outer end and a diverging portion at the outer end exactly as are the pairs of arms 6 of the sheave shown in Figs. 1 and 2. The foundation ring, however, consists of two rings 18 instead of one ring as in the sheave shown in Figs. 1 and 2, each having a machined outer circumferential surface. Each ring 18 is secured directly to the arms 6 secured to one flange 4 by welding and the rings 18, held spaced by spacer plates 19, are further secured to the arms 6 by dowels 23 passing through registering holes in the spacer plates, in the foundation rings 18 and in the flanges of the arms 6, by welding the projecting ends of the dowels 23 to the flanges of the arms 6. The slot formed by spacing the rings 18 as described is utilized to receive the threaded stem portions of stud bolts 25 of which a plurality may be provided for each section of the liner ring 21 provided with a like number of tapped radial bores to receive the threaded ends of the stud bolts for the purpose of securing the sections to the foundation rings 18 in turn secured to the arms 6 as described above. It will be noted that this method of securing the liner ring makes it unnecessary to have exact similarity of relationship of openings in each one of the several liner ring sections to receive the securing bolts and to insure absolute interchangeability for all sections as is the case with the sheave shown in Figs. 1 and 2. The spacer plates 19 alone limit the maximum arc distance between remote tapped openings in a given section of the liner ring 21. The stud bolts 25 may carry washers or plates 26 between the heads thereof and the adjacent inner circumferential surface of the foundation rings 18 to distribute the load on the bolts over a greater portion of said surface and the bolts may also carry locking disks 27 to prevent loosening or unthreading thereof, when the sheave is in operation. 15 designates a key in one of the liner sections, received within a key-way formed in both of the foundation rings 18 and the liner section for holding it and therefore also the entire series of sections constituting the liner ring 21 against relative circumferential displacement. This form of sheave is the preferred form embodying the invention for the reasons stated and permits of almost complete wearing away of the liner ring before a replacement thereof becomes necessary.

Figure 7:
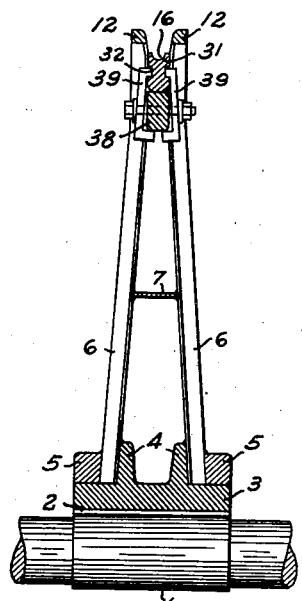
Fig. 7 is a fragmentary sectional view taken along line VII—VII of Fig. 8, looking in the direction of the arrows.
Figure 8:
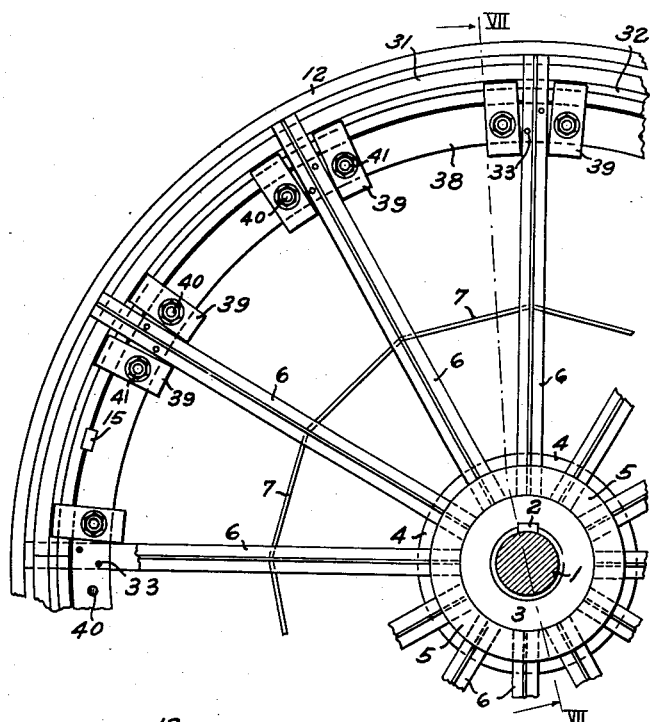
Fig. 8 is a fragmentary plan view of another modified form of sheave constructed according to this invention.
Figure 9:
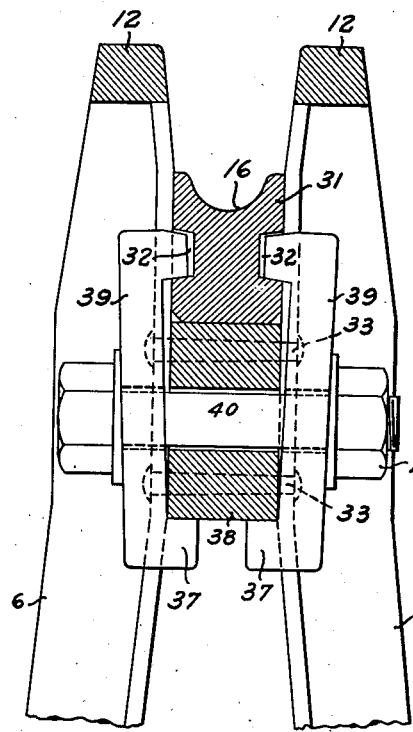
Fig. 9 is an enlarged fragmentary sectional view taken along a radial line passing through a clamping bolt of the sheave shown in Fig. 8.

In the other modified form of sheave shown in Figs. 7, 8 and 9, the foundation ring consists of a single ring 38, as in the sheave shown in Figs. 1 and 2, which is secured to the arms 6 directly by welding and by transverse dowels 33 passing therethrough and whose ends are welded to the flanges of arms 6 in the manner that the cooperating pair of rings 18 of the sheave shown in Figs. 4, 5 and 6 are secured. The individual bolt receiving openings in the liner ring sections of the sheaves shown in Figs. 1 and 2 and Figs. 4, 5 and 6 are, however, dispensed with and in place thereof the arm engaging faces of the segmental sections comprising the liner ring 31 are provided with continuous arcuate grooves 32 having bounding side walls which cooperate with the similarly shaped ends of paired clamping members 39. The clamping members 39 may be located immediately adjacent to the flanges of the T arms 6. The other ends of the clamping members 39 are provided with foundation ring-engaging-abutments 37 for firmly clamping the liner ring 31 to the foundation ring 38 when the nuts 41 cooperating with each bolt 40 of each pair of clamping members and received within an opening in the foundation ring 38, are driven home. This sheave is preferably also provided with a key 15 to prevent relative circumferential displacement between the liner ring 31 and the foundation ring 38.

The disclosed construction of sheaves in addition to eliminating considerable rope wear through reduced moment of inertia values of the sheaves, have the desirable structural feature of being built up of required lengths of structural irons which may be readily formed into the required shapes and secured in assembled relation by welding, and thereby obviate the inherent difficulties experienced with sheaves formed by casting which necessarily have large metal masses forming the rope race portion of the sheave, which brings the moment of inertia thereof to an undesirably high value. The sheaves further are constructed so that the removal of the liner ring is facilitated and may be carried out without removing the flexible rope from the sheave.

It is to be understood that it is not desired to limit the invention to the exact details of construction shown and described, for obvious modifications within the scope of the claims may occur to persons skilled in the art.

It is claimed and desired to secure by Letters Patent:

1. In a sheave, a hub, pairs of opposed radially directed arms secured to said hub, said pairs having substantially uniform circumferential spacing, a foundation ring and and a liner ring comprising a plurality of substantially uniform segmental sections, located between the arms of said pairs of arms, said foundation ring being secured to said arms, and means for detachably securing said liner ring sections to said foundation ring, the portions of each pair of arms adjacent said liner ring being in outwardly flared or diverging relation.

2. In a sheave, a hub, pairs of opposed radially directed arms secured to said hub, a foundation ring and a liner ring located between the arms of said pairs of arms, said foundation ring being secured to said arms, means for securing said liner ring to said foundation ring, the end portions, adjacent said liner ring, of each pair of arms being in outwardly flared relation, and rope guiding rings secured to said ends.

3. In a sheave, a cast steel hub, pairs of opposed radially directed structural steel T arms welded to said hub, a metallic foundation ring and a steel liner ring located between the arms of said pairs of arms, said foundation ring being welded to said arms, means for securing said liner ring to said foundation ring, the end portions, adjacent said liner ring, of each pair of arms being in outwardly flared relation, and metallic rope guiding rings secured to said ends.

4. In a sheave, a cast steel hub, pairs of opposed radially directed structural steel T arms welded to said hub, a metallic foundation ring and a steel liner ring located between the arms of said pairs of arms, said foundation ring being welded to said arms, means for detachably securing said liner ring to said foundation ring, the end portions, adjacent said liner ring, of each pair of arms being in outwardly flared relation, metallic rope guiding rings welded to said ends, and a metallic stiffening ring welded to said arms at an intermediate portion thereof.

5. In a sheave, a hub, a plurality of pairs of opposed arms secured to said hub and radiating therefrom, a foundation ring located between the arms of said pairs and secured thereto, a plurality of segmental sections forming a liner ring located between said arms and detachably secured upon said foundation ring, the portion of each arm adjacent to said liner ring being flared outwardly, and rope guiding rings secured to the outwardly flared portions of said arms.

6. In a sheave, a hub, a plurality of pairs of opposed arms secured to said hub and radiating therefrom, a foundation ring located between the arms of said pairs and secured thereto, a plurality of segmental sections forming a liner ring located between said arms and detachably secured upon said foundation ring, the portion of each arm adjacent to said liner ring being flared outwardly, rope guiding rings secured to the outwardly flared portions of said arms, and a stiffening ring arranged concentric with said hub intermediate said hub and said foundation ring between said arms of said pairs and secured thereto.

7. A sheave comprising a hub, pairs of spokes secured to and radiating from said hub the spokes of each pair being arranged in axial spaced relation, a pair of guide rings connected respectively to the ends of the respective spokes of each pair of spokes, and a sheave rim secured between said spokes of each pair and spaced inwardly from the guide rings on the ends of said spokes.

8. A sheave comprising a hub, pairs of axially spaced spokes attached to said hub and radiating therefrom in two transverse planes thereof, a pair of guide rings arranged concentric with said hub and attached respectively to the ends of the spokes in each plane, and a sheave rim carried between said axially spaced spokes in cooperating relation to said guide rings to form a groove for a rope.

9. A sheave comprising a hub, spokes attached to and radiating from said hub, a pair of foundation rings carried in spaced relation on said spokes, sectors forming a liner ring carried on the peripheries of said foundation rings, and bolts disposed radially between said foundation rings and engaging said sectors to secure them in position on said rings.

10. A pulley comprising a hub, a plurality of axially spaced pairs of spokes secured to said hub, a pair of guide rings attached to the respective ends of the spokes of each pair, a pair of foundation rings attached to the respective spokes at the inner sides thereof near their ends, spacer blocks disposed between said foundation rings to space them and attached thereto to secure said rings and pairs of spokes together, pulley liner segments carried on the peripheries of said foundation rings, and bolts extending radially between said foundation rings and engaging said segments to secure them in position.

ALEXANDER J. NICHT, JR.